United States Patent
Cornpropst et al.

(10) Patent No.: US 7,464,263 B2
(45) Date of Patent: Dec. 9, 2008

(54) METHOD, SYSTEM AND PROGRAM PRODUCT FOR ASSOCIATING EVENT CATEGORIZATION AND ROUTING WITH SECURITY AUTHORIZATION ROLES

(75) Inventors: Jason H. Cornpropst, Mebane, NC (US); Carlos Cesar F. Araujo, Cary, NC (US); John E. Dinger, Cary, NC (US); Kevin A. Kizer, Apex, NC (US); Denilson Nastacio, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 868 days.

(21) Appl. No.: 10/808,847

(22) Filed: Mar. 25, 2004

(65) Prior Publication Data

US 2005/0216766 A1 Sep. 29, 2005

(51) Int. Cl.
*G06F 9/00* (2006.01)
(52) U.S. Cl. .................... 713/153; 713/162
(58) Field of Classification Search .......... 713/153, 713/162
See application file for complete search history.

(56) References Cited

U.S. PATENT DOCUMENTS

| 5,615,135 | A | * | 3/1997 | Waclawsky et al. | 702/182 |
| 5,751,933 | A | * | 5/1998 | Dev et al. | 714/4 |
| 5,761,085 | A | * | 6/1998 | Giorgio | 702/33 |
| 6,985,901 | B1 | * | 1/2006 | Sachse et al. | 707/10 |

* cited by examiner

*Primary Examiner*—Thomas R Peeso
(74) *Attorney, Agent, or Firm*—David Irvin; Hoffman Warnick LLC

(57) ABSTRACT

Under the present invention, when an event is received on a server, it is stored and then categorized. In being categorized, an event group pertaining to the event is identified. Based on the group of events, a set (e.g., one or more) of destinations to which the event should be routed can be determined. The group of events is then associated with an access control list (ACL) that contains entries identifying users (or groups of users) and their permissions to interact with events in that group. Once the association is made, the event and optionally the ACL is routed to the appropriate destinations. Based on the permissions contained in the ACL, the destinations will interact with the event accordingly.

7 Claims, 3 Drawing Sheets

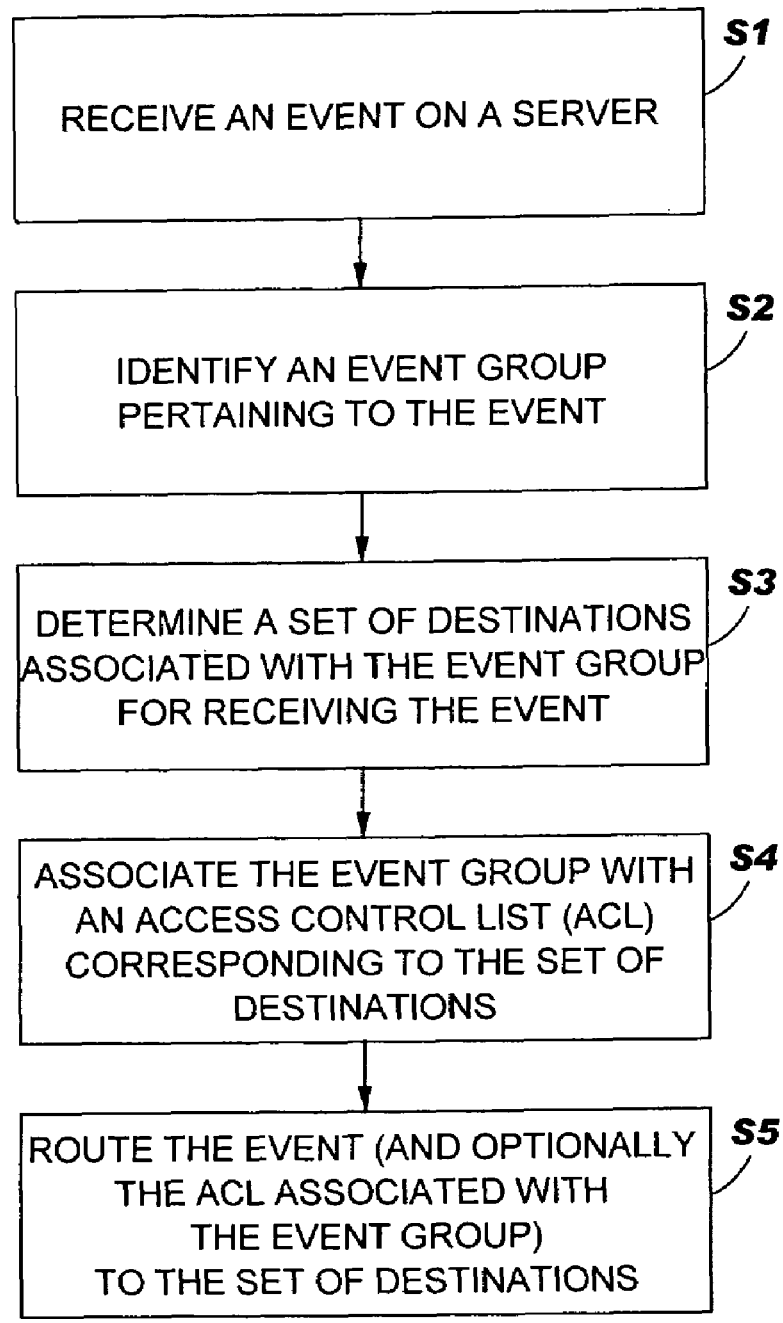

METHOD, SYSTEM AND PROGRAM PRODUCT FOR ASSOCIATING EVENT CATEGORIZATION AND ROUTING WITH SECURITY AUTHORIZATION ROLES

BACKGROUND OF THE INVENTION

1. Field of the Invention

In general, the present invention relates to a method, system and program product for associating event categorization and routing with security authorization roles. Specifically, the present invention alleviates the need for separate processing to route events and to determine authorization rights for interacting with the event.

2. Related Art

As computer infrastructures have become more advanced, increased functionality has been provided. One function common within many infrastructures is the capability to generate alerts or events as changes to the resources within the infrastructures occur. For example, if a client or application within the infrastructure fails, an information technology (IT) event detailing the failure can be generated and transmitted to the server. Once received, the server handles the categorization and routing of the event to appropriate destinations (e.g., users or groups of users).

Current event management solutions separate the concepts of categorizing and routing events from the security of the events. Specifically, it is normally left up to secondary processing to determine whether a client application has the correct credentials to interact (e.g., read and/or write) with an event (or group of events). That is, the security authorization process is not performed at the time the event is received/retrieved or routed to the client. Accordingly, after an event is received and categorized, it is routed to the client where security permissions are determined and enforced. This not only increases the amount of processing that must be performed at the client side, but it could also lead to unnecessary routing of events to clients that are not authorized to interact therewith.

To this extent, no existing solution allows security authorization to be performed on the server side as categorization is occurring. That is, no existing solution allows security permission determination to occur prior to the routing of an event to its destination. In view of the foregoing, there exists a need for a method, system and program product for associating event categorization and routing with security authorization roles. Specifically, a need exists for a system whereby association of security authorization roles occurs on the server side. A further need exists for the association of security authorization roles to occur prior to the routing of events to the appropriate destinations.

SUMMARY OF THE INVENTION

In general, the present invention provides a method, system and program product for associating event categorization and routing with security authorization roles. Specifically, under the present invention, when an event is received on a server, it is stored and then categorized. In being categorized, an event group pertaining to the event is identified. Based on the group of events, a set (e.g., one or more) of destinations to which the event should be routed can be determined. The group of events is then associated with an access control list (ACL) that contains entries identifying users (or groups of users) and their permissions to interact with events in that group. Once the association is made, the event (and optionally the ACL itself) is routed/published to the appropriate destinations. Based on the permissions contained in the ACL, the destinations will interact with the event accordingly. In addition, because the association is performed on the server side, the present invention also accommodates synchronous operations whereby a user or group of users can query the server about an event and interact therewith according to their listed permissions.

A first aspect of the present invention provides a method for associating event categorization and routing with security authorization roles, comprising: receiving an event on a server; identifying an event group pertaining to the event; determining a set of destinations associated with the event group for receiving the event; and associating the event group with an access control list (ACL) corresponding to the set of destinations, wherein the ACL includes a set of entries that each identify at least one user and a permission of the at least one user for interacting with the event.

A second aspect of the present invention provides a system for associating event categorization and routing with security authorization roles, comprising: an event reception system for receiving an event on a server; a categorization system for categorizing the event by identifying an event group pertaining to the event; a destination system for determining a set of destinations associated with the event group for receiving the event; and a list association system for associating the event group with an access control list (ACL) corresponding to the set of destinations, wherein the ACL includes a set of entries that each identify at least one user and a permission of the at least one user for interacting with the event.

A third aspect of the present invention provides a program product stored on a recordable medium for associating event categorization and routing with security authorization roles, which when executed, comprises: program code for receiving an event on a server; program code for categorizing the event by identifying an event group pertaining to the event; program code for determining a set of destinations associated with the event group for receiving the event; and program code for associating the event group with an access control list (ACL) corresponding to the set of destinations, wherein the ACL includes a set of entries that each identify at least one user and a permission of the at least one user for interacting with the event.

Therefore, the present invention provides a method, system and program product for associating event categorization and routing with security authorization roles.

BRIEF DESCRIPTION OF THE DRAWINGS

These and other features of this invention will be more readily understood from the following detailed description of the various aspects of the invention taken in conjunction with the accompanying drawings in which:

FIG. 3 depicts a method flow diagram according to the present invention.

Figure 1:
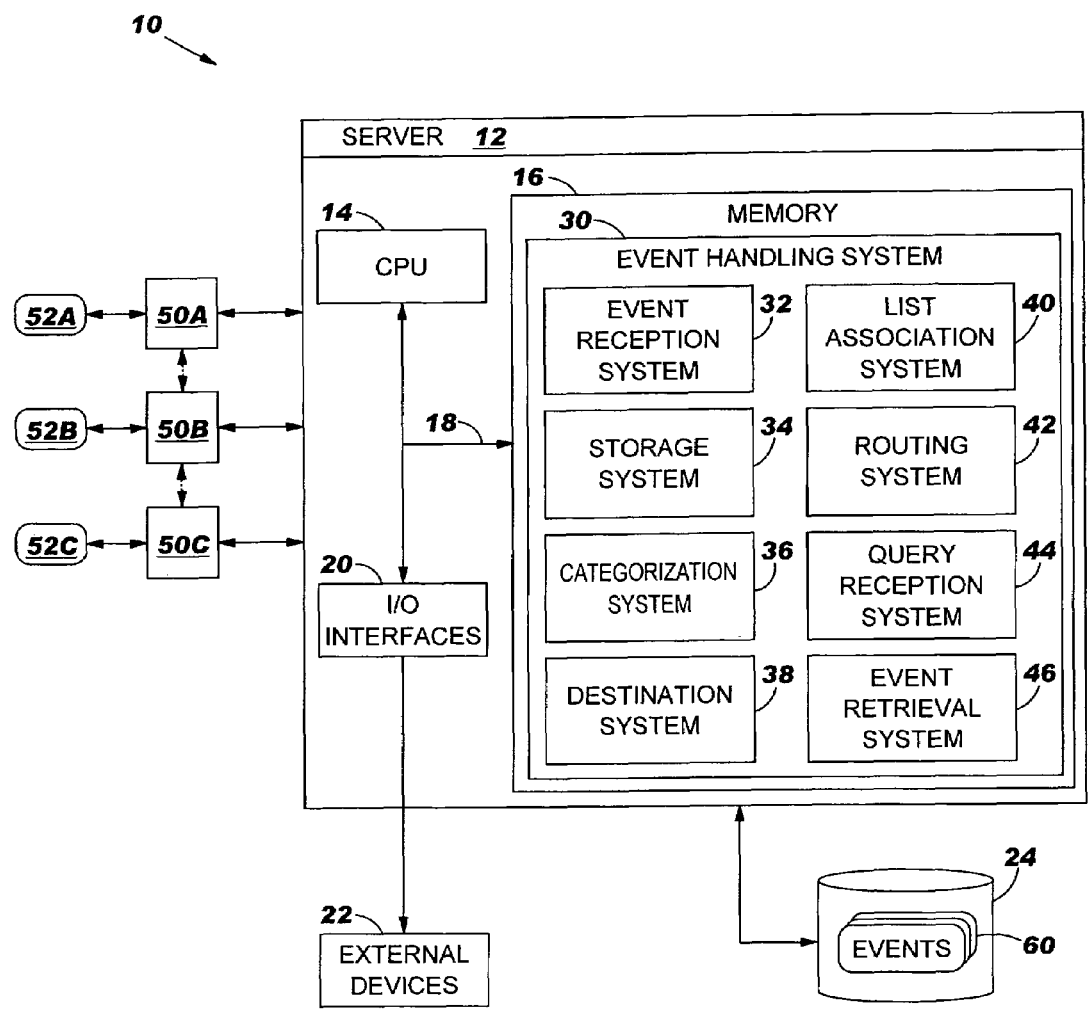
FIG. 1 depicts a system for associating event categorization and routing with security authorization roles according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

As indicated above, the present invention provides a method, system and program product for associating event categorization and routing with security authorization roles. Specifically, under the present invention, when an event is received on a server, it is stored and then categorized. In being categorized, an event group pertaining to the event is identified. Based on the group of events, a set (e.g., one or more) of destinations to which the event should be routed can be determined. The group of events is then associated with an access control list (ACL) that contains entries identifying users (or groups of users) and their permissions to interact with events in that group. Once the association is made, the event (and optionally the ACL) is routed to the appropriate destinations. Based on the permissions contained in the ACL, the destinations will interact with the event accordingly. In addition, because the association is performed on the server side, the present invention also accommodates synchronous operations whereby a user or group of users can query the server about an event and interact therewith according to their listed permissions.

Referring now to FIG. 1, a system 10 for associating event categorization and routing with security authorization roles according to the present invention is shown. As depicted, system 10 includes server 12 in communication with clients 50A-C (operated by users 52A-C. It should be understood that system 10 is intended to represent only an illustrative computer infrastructure. To this extent, any quantity of clients and servers could be shown. In addition, system 10 should be understood to include other resources (e.g., hardware and software) not shown.

In any event, communication between server 12 and clients 50A-C could occur over any type of network such as the Internet, a local area network (LAN), a wide area network (WAN), a virtual private network (VPN), etc. Such communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, clients 50A-C could utilize an Internet Service Provider to establish connectivity to server 12. These concepts also apply to any direct (e.g., peer-to-peer) communication that could optionally be provided among clients 50A-C.

Server 12 generally comprises central processing unit (CPU) 14, memory 16, bus 18, input/output (I/O) interfaces 20, external devices/resources 22 and storage unit 24. CPU 14 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, etc. Moreover, similar to CPU 14, memory 16 may reside at a single physical location, comprising one or more types of data storage, or be distributed across a plurality of physical systems in various forms.

I/O interfaces 20 may comprise any system for exchanging information to/from an external source. External devices/resources 22 may comprise any known type of external device, including speakers, a CRT, LCD screen, handheld device, keyboard, mouse, voice recognition system, speech output system, printer, monitor/display, facsimile, pager, etc. Bus 18 provides a communication link between each of the components in server 12 and likewise may comprise any known type of transmission link, including electrical, optical, wireless, etc.

Storage unit 24 can be any system (e.g., database) capable of providing storage for information under the present invention. Such information could include, for example, events 60, etc. As such storage unit 24 could include one or more storage devices, such as a magnetic disk drive or an optical disk drive. In another embodiment, storage unit 24 includes data distributed across, for example, a local area network (LAN), wide area network (WAN) or a storage area network (SAN) (not shown). Although not shown, additional components, such as cache memory, communication systems, system software, etc., may be incorporated into server 12.

Shown in memory 16 of server 12 is event handling system 30. Under the present invention, event handling system 30 allows the categorization and routing of events to be associated with security authorization roles on server 12. It should be understood that, as used herein, the term "event" is intended to refer to any type of behavior or message related thereto occurring within system 10 that requires notification of clients 50A-C and/or some type of corrective action. For example, if an application program loaded on server 12 that is used by one or more clients 50A-C fails, an event would be generated. Similarly, if a client or an application program loaded thereon fails, and event would be generated (and communicated to server 12). Accordingly, in a typical embodiment, the term "event" refers to an information technology (IT) event occurring within system 10 and its corresponding notification/message detailing the failure.

As indicated above, previous technologies separated the categorization and routing of events from the security authorization process. To this extent, although event routing was handled on a server, the security authorization processing for the events occurred on individual clients. This required the individual clients to access various permissions for interacting with the events. In sharp contrast, the present invention merges the two processes so that an event is routed to clients 50A-C along with any applicable permissions.

The functions of the present invention will be described in conjunction with FIGS. 1 and 2 collectively. As first shown in FIG. 1, event handling system 30 generally includes event reception system 32, storage system 34, categorization system 36, destination system 38, list association system 40, routing system 42, query reception system 44 and event retrieval system 46. Assume in an illustrative example that client 50C (or a system loaded thereon has failed). In such an instance, an event would be generated and communicated to server 12. The event would be received by event reception system 32, and then optionally stored in storage unit 24 by storage system 34. As will be further described below, the storage of events allows for the synchronous access thereof in the future. Regardless, after the event has been received (and stored), categorization system 36 will categorize the event by determining an event group pertaining thereto.

Figure 2:
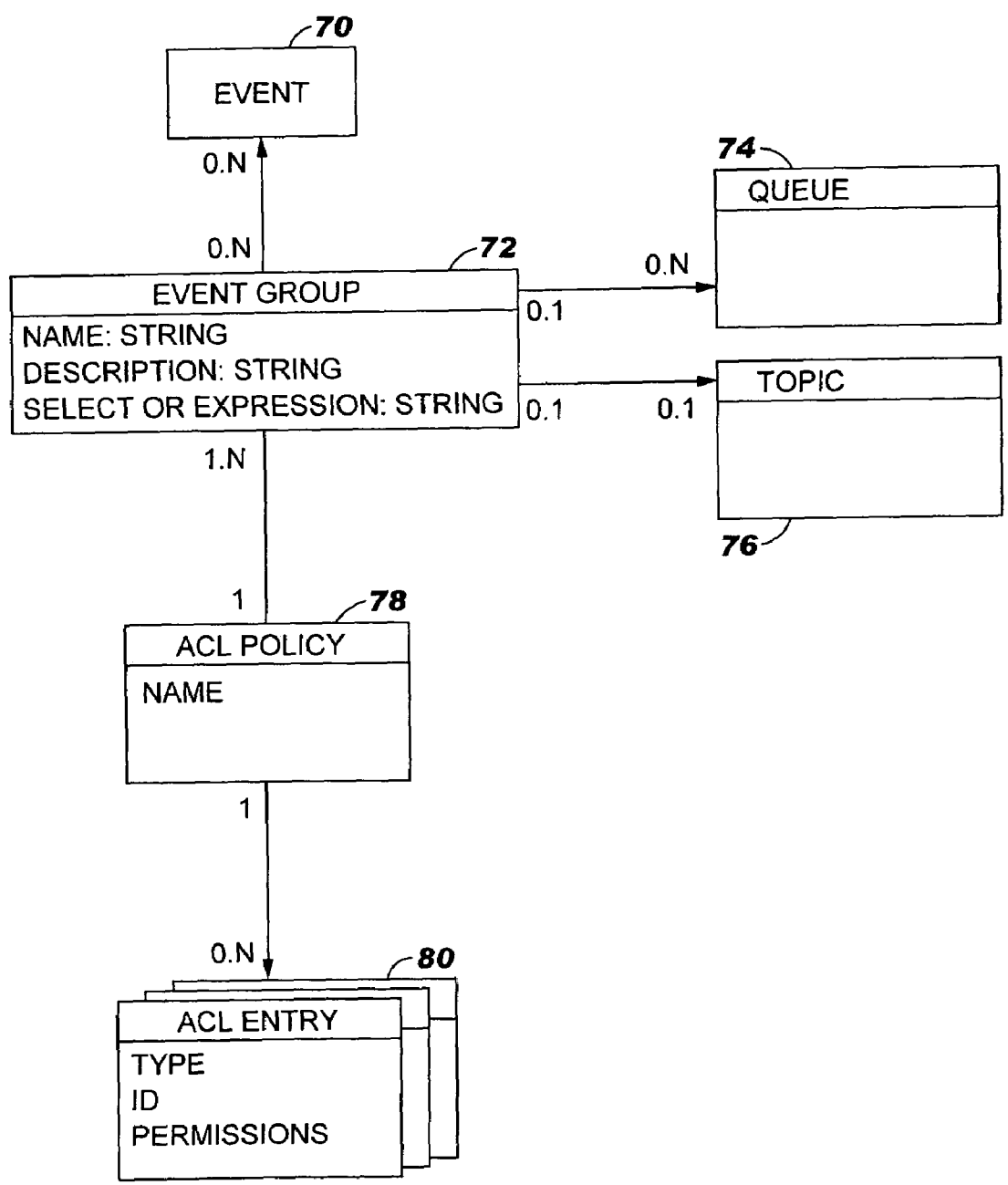
FIG. 2 depicts the association of an event group with an ACL according to the present invention.

Referring to FIG. 2, the relationship between event 70 and event group 72 is shown in greater detail. In general, each event group 72 has a group name field, a group description field and a selector expression field. Assume in this illustrative example that each client 50A-C has its own event group 72. In a typical embodiment, the group name field of the event group 72 will set forth the host name of the corresponding client 50A-C. Accordingly, in this example, the name of event group 72 could be the host name of client 50C. As such, all events occurring on client 50C could fall under event group 72. The description field of event group 72 allows a specific explanation of the event group to be set forth. Still yet, the selector expression field of event group 72 allows certain criteria to be set forth for determining whether event 70 is part of that event group 72. For example, the selector expression could indicate that any events originating from a client 50C having a host name matching that set forth in the name field belongs to that event group 72. In such a case, any event that occurred on client 50C could be categorized under event group 72.

Referring back to FIG. 1, once the event group for the event has been identified, a set (e.g., one or more) of destinations for receiving the event will be determined by destination system 38. As is well known, the failure of one system could have ramifications on other systems. Accordingly, such other systems should receive the event. Determination of the set of destinations is performed based on the event group. Specifically, each event group has a particular set of destinations to which event should be routed. A destination could include a single user/client or a group of users/clients. In this example, assume that the set of destinations includes other users 52A-B. As such, the event will be routed to clients 50A-B. Before the event is routed, however, list association system 40 will associate/link an access control list (ACL) corresponding to the identified set of destinations with the identified event group 72 (FIG. 2). Specifically, the list association system 40 will locate the one or more ACL(s) that correspond to the set of destinations and associate the same therewith.

Referring to FIG. 2, the association of ACL 78 to event group 72 will be described in greater detail. As shown, ACL 78 includes a list name field and a set of entries 80. In a typical embodiment, ACL 78 will be associated with event group 72 based on its name field. Accordingly, ACL 78 could be assigned the same name as event group 72 (e.g., the host name of client 50C). As further shown in FIG. 2, each entry 80 has a type field, an identifier field and a permission field. The type field indicates whether entry 80 pertains to a "user" or a "group of users." For example, entry 80 could be made applicable to both users 52A-B, or only to a single user such as user 52A. The identifier field will specifically identify the user or group of users described in the type field. For example, the identifier could indicate users "52A and 52B" (or a single user depending on what is specified in the type field). The permission field sets forth a permission for the applicable user(s) to interact with events falling within the event group 72. Such permission could be "read," "write," or "read/write." The "read" permission would give the applicable user(s) the authority to subscribe to the queue 74 or topic 76 associated with that event group 72. It also grants the applicable user(s) the authority to query events associated with that event group 72. The "write" permission has no bearing on queue 74 or topic 76 for event group 72, but it grants the applicable user(s) the authority to update or delete events associated with event group 72. The "read/write" permission would grant the applicable user(s) both "read" and "write" permissions.

Referring back to FIG. 1, once the ACL 78 (FIG. 2) has been associated with the applicable event group 72 (FIG. 2), routing system 42 will route the event 70 (FIG. 2), and optionally the ACL 78 (FIG. 2) associated with event group 72, to the set of destinations previously determined by destination system 38. If clients 50A-B receive both event 70 and ACL 78, this alleviates the need for either client 50A-B to query or otherwise independently access ACL 78. Based on the permissions in ACL 78, users 52A-B will interact with event 70 accordingly. Conversely, if ACL 78 is not routed with event 70, users 52A-B could access the permissions contained therein on a subscription basis (e.g., by communicating with server 12). For example, upon receiving event 70, users 50A-B could communicate with server 12. Such a communication could specifically identify event 70 (e.g., according to a unique identifier assigned thereto by event handling system 30 upon initial receipt by server 12). Since event 70 has been associated with ACL 78 on server 12, the permissions for users 50A-B are easily and efficiently determined. Similarly, users 52A-C could subscribe to certain "topics" for which they will receive related events.

It should be appreciated that in addition to storing event 70, storage system 34 could also store the determined set of destinations, the identified event group 72 pertaining to event 70 and/or the ACL 78 (or its association with event group 72) in storage unit 24. This allows the present invention to easily accommodate synchronous querying of events (as well as the above example involving the asynchronous notification of events). Specifically, clients 50A-C could also be provided with the capability to query server 12 to further interact with events. For example, assume that client 50A wishes to later query server 12 to interact with event 70 (FIG. 2). In this case, the query would be received by query reception system 44. Event retrieval system 46 would then retrieve event 70 and the ACL 78 from storage unit 24. Based on the permissions in ACL 78, user 50A could attempt to further interact with event 70.

It should also be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Referring now to FIG. 3, a method flow diagram 100 according to the present invention is shown. As depicted, first step S1 is to receive an event on a server. Second step S2 is to identify an event group pertaining to the event. Third step S3 is to determine a set of destinations associated with the event group for receiving the event. Fourth step S4 is to associate the event group with an access control list (ACL) corresponding to the set of destinations. Fifth step S5 is to route the event (and optionally the ACL associated with the event group) to the set of destinations after the associating step.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the illustrative representation of event handling system 30 shown in FIG. 1 is not intended to be limiting. That is, the functions of the present invention described herein could be represented by a different configuration of systems.

We claim:

1. A method for associating event categorization and routing with security authorization roles, comprising:
   receiving an event on a server;
   identifying an event group pertaining to the event;
   determining a set of destinations associated with the event group for receiving the event; and
   associating the event group with an access control list (ACL) corresponding to the set of destinations, wherein the ACL includes a set of entries that each identify at least one user and a permission of the at least one user for interacting with the event,
   wherein the event is an information technology (IT) event pertaining to a computer system in communication with the server.

2. The method of claim 1, further comprising routing the event to the set of destinations after the associating step.

3. The method of claim 1, wherein the computer system is a client.

4. The method of claim 1, further comprising storing the event on the server after the receiving step.

5. The method of claim 4, further comprising;
   receiving a query for the event on the server from a requestor;
   retrieving the event from storage;
   routing event and the ACL associated with the event group to the requestor.

6. The method of claim 1, wherein the event group has a group name, a group description and a selector expression.

7. The method of claim 6, wherein the associating step comprises associating the group name of the event group with a list name of the ACL.

* * * * *